United States Patent
Goodwin

[11] Patent Number: 5,441,190
[45] Date of Patent: Aug. 15, 1995

[54] APPARATUS FOR DISPLACING A CONTINUOUS SHEET OF MATERIAL

[75] Inventor: Charles Goodwin, Staffs, Great Britain

[73] Assignee: Sumitomo Rubber Industries, Ltd., Hyogo, Japan

[21] Appl. No.: 110,679

[22] Filed: Aug. 9, 1993

Related U.S. Application Data

[63] Continuation of Ser. No. 677,240, Mar. 29, 1991, abandoned.

[30] Foreign Application Priority Data

Mar. 31, 1990 [GB] United Kingdom ............... 9007323

[51] Int. Cl.⁶ .................................... B23Q 16/00
[52] U.S. Cl. ................................. 226/18; 226/21
[58] Field of Search ....................... 226/15, 18, 21

[56] References Cited

U.S. PATENT DOCUMENTS

| | | | |
|---|---|---|---|
| 4,069,959 | 1/1978 | Bartell et al. | 226/21 |
| 4,477,006 | 10/1984 | Sharp | 226/21 |
| 4,863,087 | 9/1989 | Kohler | 226/15 |
| 4,901,903 | 2/1990 | Blanding | 226/21 |
| 5,019,864 | 5/1991 | Blanding | 226/15 X |
| 5,074,450 | 12/1991 | Lindner et al. | 226/21 |

Primary Examiner—Daniel P. Stodola
Assistant Examiner—Eileen A. Dunn
Attorney, Agent, or Firm—Birch, Stewart, Kolasch & Birch

[57] ABSTRACT

An apparatus for displacing a continuous flat sheet of material having a first edge and a second edge, running along a first plane in a first direction which is the direction of its centerline to a parallel but sideways displaced direction in a second plane the direction being parallel to the first, in which the second edge of the sheet is displaced from the first plane to decrease the path length in the first plane of the second edge relative to the first edge to produce a first change in direction of running and subsequently to displace the first edge from the second plane to decrease the path length in the second plane of the first edge relative to the second edge to similarly produce a second change in direction of running equal in magnitude but in an opposite direction to the first change in direction so that the final direction of running is parallel to the first direction of running.

13 Claims, 5 Drawing Sheets

APPARATUS FOR DISPLACING A CONTINUOUS SHEET OF MATERIAL

This application is a continuation of application Ser. No. 07/677,240 filed on Mar. 29, 1991, now abandoned.

BACKGROUND OF THE INVENTION

1. Field of the Invention

This invention relates to a method and apparatus for displacing a continuous flat, sheet of material and particularly to a conveyor suitable for carrying pliable sheet material such as an uncured rubber compound.

2. Description of Related Art

Sheets of such material are conventionally made by extrusion or calendering and may comprise a flat sheet 80–100 cms wide but only 3 or 4 mm thick.

Extruded sheet compound is usually trimmed by edge trimming knife blades and to do this most effectively requires accurate and adjustable alignment of the sheet as it is conveyed to the knife blades along a conveyor.

Sideways displacement of sheet of this type is conventionally achieved by means of carrying the material to a roller substantially displaced above the feed conveyor and slightly twisting the sheet during the displacement to provide a turn in the sheet path, carrying the sheet on a straight conveyor length to a second high mounted roller and then bringing the sheet back to its original conveyor level with a second twist to return the path to one displaced from but parallel to the original feed direction.

Such conveyor devices, however, are long and high and do not allow effective adjustment of the amount of sideways displacement as is required to adjust the feed to edge trimming knives or the like. Furthermore they are not suitable for a thin or particularly pliable sheet as the sheet is not supported during its vertical twisting movements.

SUMMARY OF THE INVENTION

It is an object of the present invention to provide a compact controllable means of displacing sheet material on a conveyor system.

Accordingly, one aspect of the invention provides a method of displacing a continuous flat sheet of material having a first edge and a second edge running along a first plane in a first direction which is the direction of its centerline to a parallel but sideways displaced direction in a second plane, the direction being parallel to the first, in which the second edge of the sheet is displaced from the first plane to decrease the path length in the first plane of the second edge relative to the first edge to produce a first change in direction of running and subsequently to displace the first edge from the second plane to decrease the path length in the second plane of the first edge relative to the second edge to similarly produce a second change in direction of running equal in magnitude but in an opposite direction to the first change in direction so that the final direction of running is parallel to the first direction of running.

Preferably the change in direction of running is produced by a relative difference of the path length in the plane of the two edges of the sheet due to the unequal displacement of both edges from the plane.

According to a second aspect of the invention an apparatus for the aforementioned method comprising a feed conveyor carrying the sheet longitudinally in a plane to a first support roller extending perpendicularly to the centerline of the feed conveyor, a second support roller parallel to the first support roller and having means to displace at least one end of said second roller from the plane, a third roller parallel to the first support roller, and longitudinally spaced from the second support roller and having means to displace at least its other end from the plane and an output roller and conveyor running parallel to the direction of the feed conveyor such that the displacements of the second and third respective rollers may affect sideways displacement of the sheet between the parallel feed and output directions.

Preferably the apparatus provides second and third rollers which are positioned to the same side of the plane of the inner conveyor and when one end is further displaced from said plane the other end is moved towards the plane to effect a reduction and an increase respectively in the path lengths of the two edges concerned.

The second and third rollers may be the beginning and end rollers of a set for support rollers or mutually parallel when viewed perpendicular to the plane and these may be mounted between a pair of parallel side frames which are interconnected and provided with driving means to give the necessary roller displacement. The interconnection and drive means may comprise a transverse strut mounted on a base frame with mechanical cams to cause the motion.

BRIEF DESCRIPTION OF THE DRAWINGS

Further aspects of the present invention will become apparent from the following description of one embodiment of the invention in conjunction with the attached diagramatical drawings in which.

DETAILED DESCRIPTION OF PREFERRED EMBODIMENTS

Figure 1:
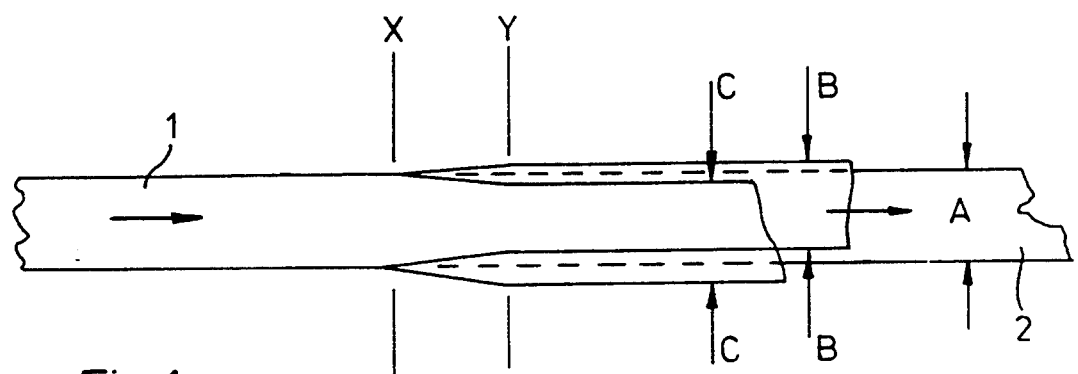
FIG. 1 is a diagram showing the path of a flat sheet through the conveyor system.
Figure 2A:
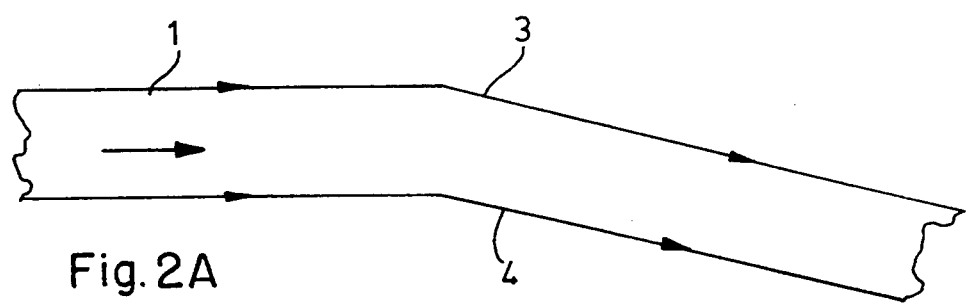
FIG. 2A is an enlarged top view and FIG. 2B is an enlarged side view of the first displacement in FIG. 1.
Figure 2B:
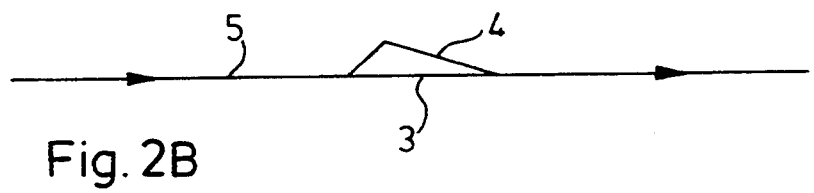
Figure 3:
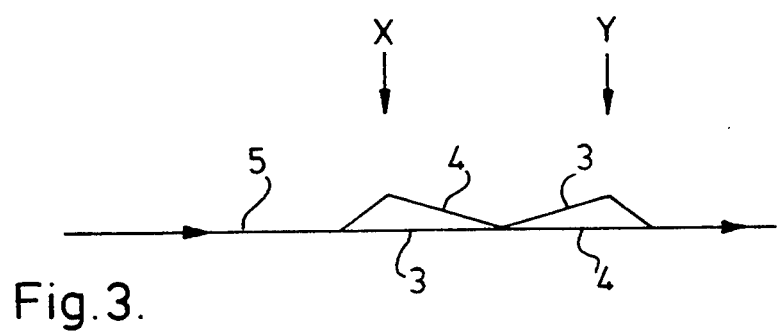
FIG. 3 is a side view on FIG. 1 showing the paths of the sheet edges.

The invention, as shown in FIG. 1 is to provide for a longitudinally moving flat sheet of material (1) which would normally exit the conveyor system between the arrows A i.e. as sheet 2, with means to position the sheet in the position of arrows B, or arrows C, as required for an input to a second machine which may for example be a side trimming machine. The method of doing this is to provide at a first point X a small angular turn in the path followed by the sheet 1 and at a second point Y, a second angular turn back to a path which is parallel to the original longitudinal feed direction of the sheet 1. This can be affected as shown in FIGS. 2A and 2B by changing the path length of one side of the conveyor in the horizontal plane. Thus as shown in FIG. 2 if the sheet 1 is moving from left to right of the page, and it has a left hand edge 3 and a right hand edge 4, if the right hand edge 4 is taken around a path length lifting it from the horizontal plane 5 in which the input sheet is running and then returning it back to that plane 5, then the effective path length in the horizontal direction of the right hand edge 4 is reduced. This reduction results in a right hand turn when considered in the horizontal direction of the sheet as shown. This is the action at point X and a similar action at point Y where the left hand edge 3 is diverted from the plane 5 by lifting it while the right hand edge is kept in the plane 5 will cause a second acute angle turn and this, assuming the path length differences are matched will give a resultant output path parallel to the input direction and in the same plane.

Thus the method of the present invention comprises diverting one edge of the flat sheet from the plane in which it is running into the apparatus so that it is effectively slowed in horizontal direction and then diverting the other edge to bring the output direction into a direction parallel to the input direction. The method provides a means of adjusting the deflections and therefore the angles of diversions of the sheet path which can be adjusted by a simple means so that output direction of the flat sheet can be moved readily from side to side of the original path without deformation of the sheet.

Figure 4:
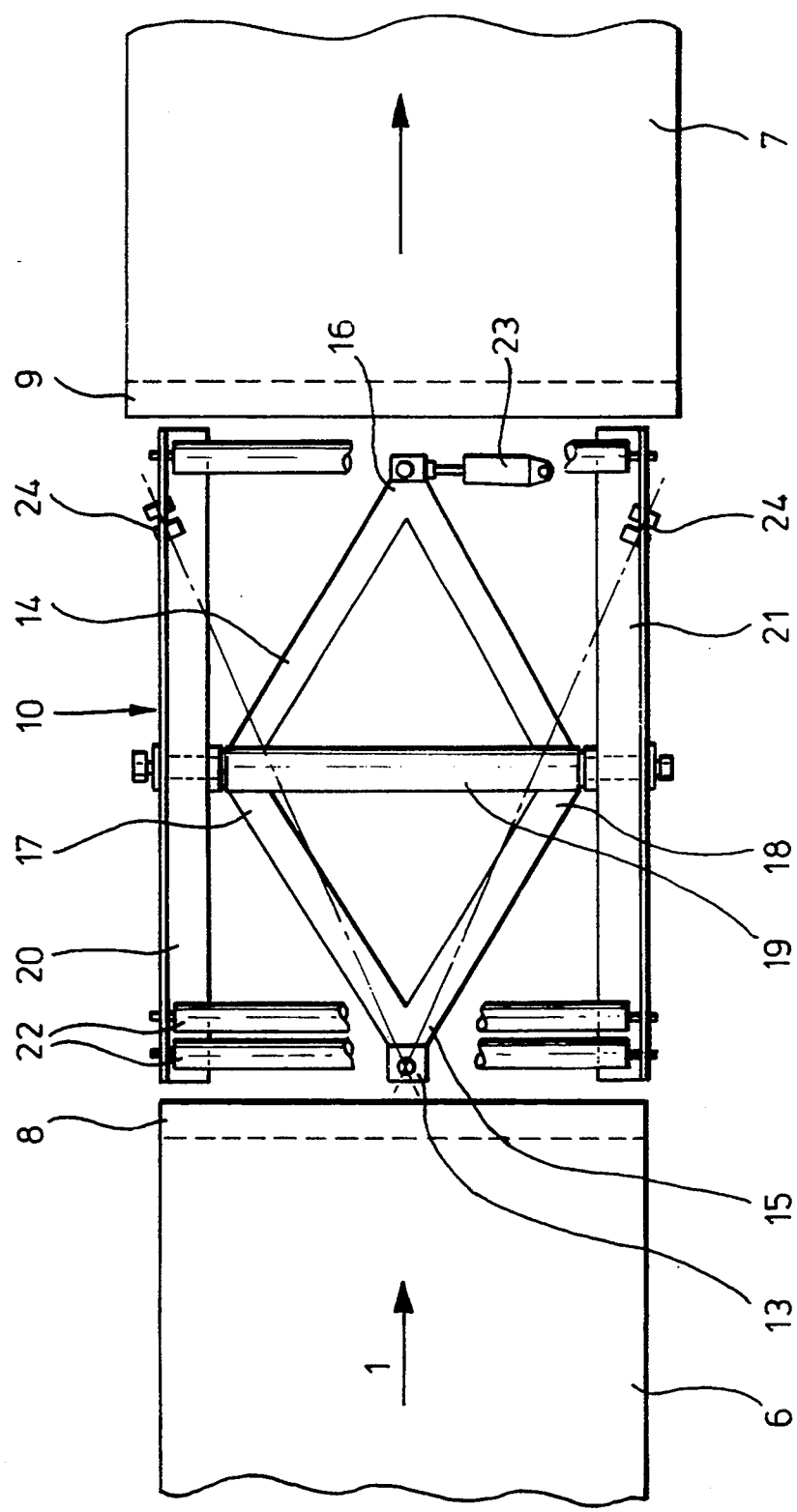
FIG. 4 is a plan view of a conveyor system.
Figure 5:
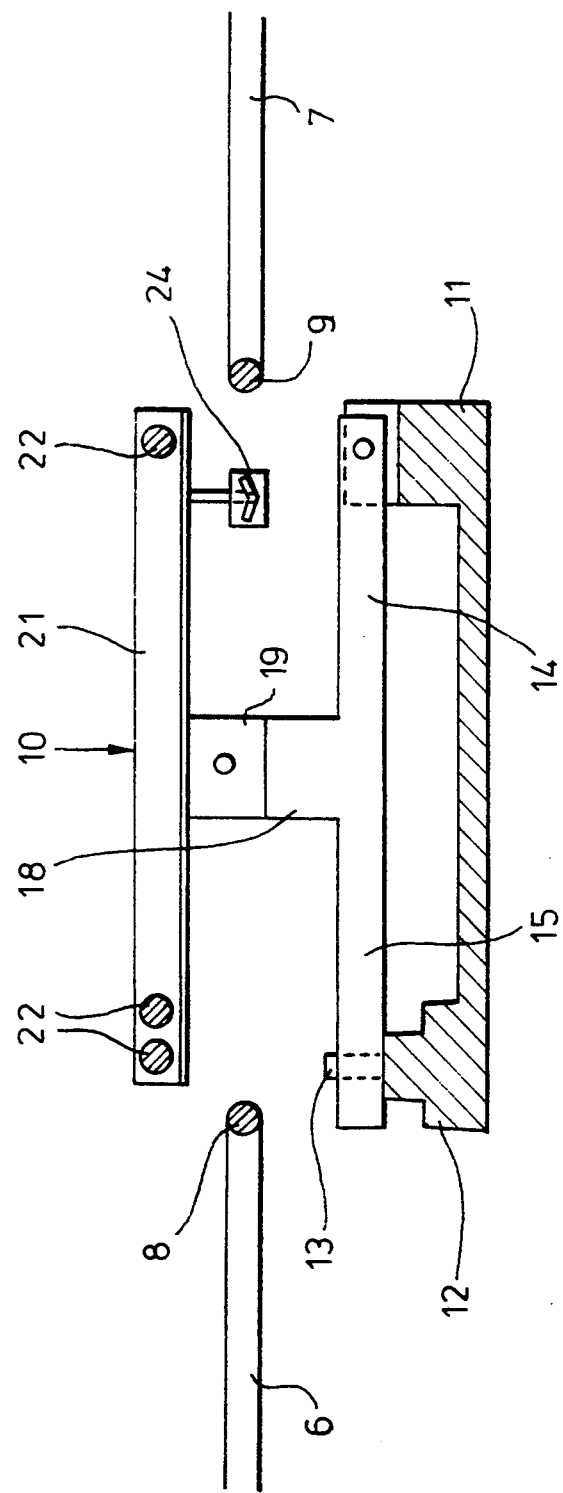
FIG. 5 is a side view of the conveyor shown in FIG. 4.

An apparatus to effect this invention is shown in FIGS. 4 and 5 and basically comprises an input conveyor 6 and an output conveyor 7 both of which may be belt conveyors or roller type conveyors. For ease in understanding the disclosure, those elements seen at the input end of the apparatus or adjacent the input conveyor will be referred to as an input side element, whereas those elements seen at the output end will be referred to as an output side element. The input conveyor 6 has a first feed or support roller 8 perpendicular to the incoming direction 1 of the sheet carried on the conveyor 6 and the output conveyor 7 has an output roller 9 to take the sheet from the device and feed it onto the output conveyor 7.

Between the input and output rollers 8 and 9 is mounted a short conveyor mechanism 10 which is the real subject of the present invention.

Figure 6:
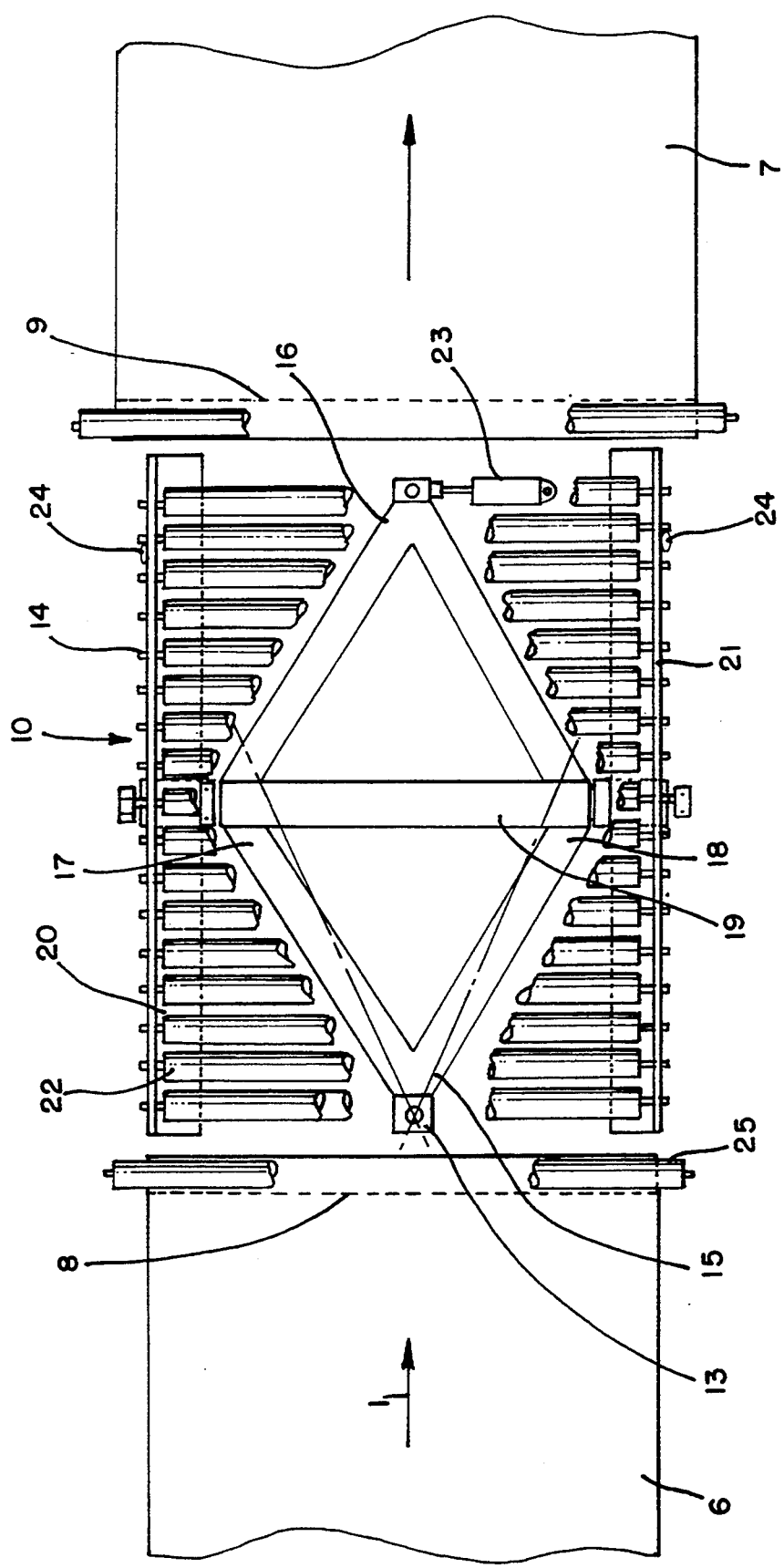
FIG. 6 is a plan view of a conveyor system showing a plurality of rollers in connection therewith.
Figure 7:
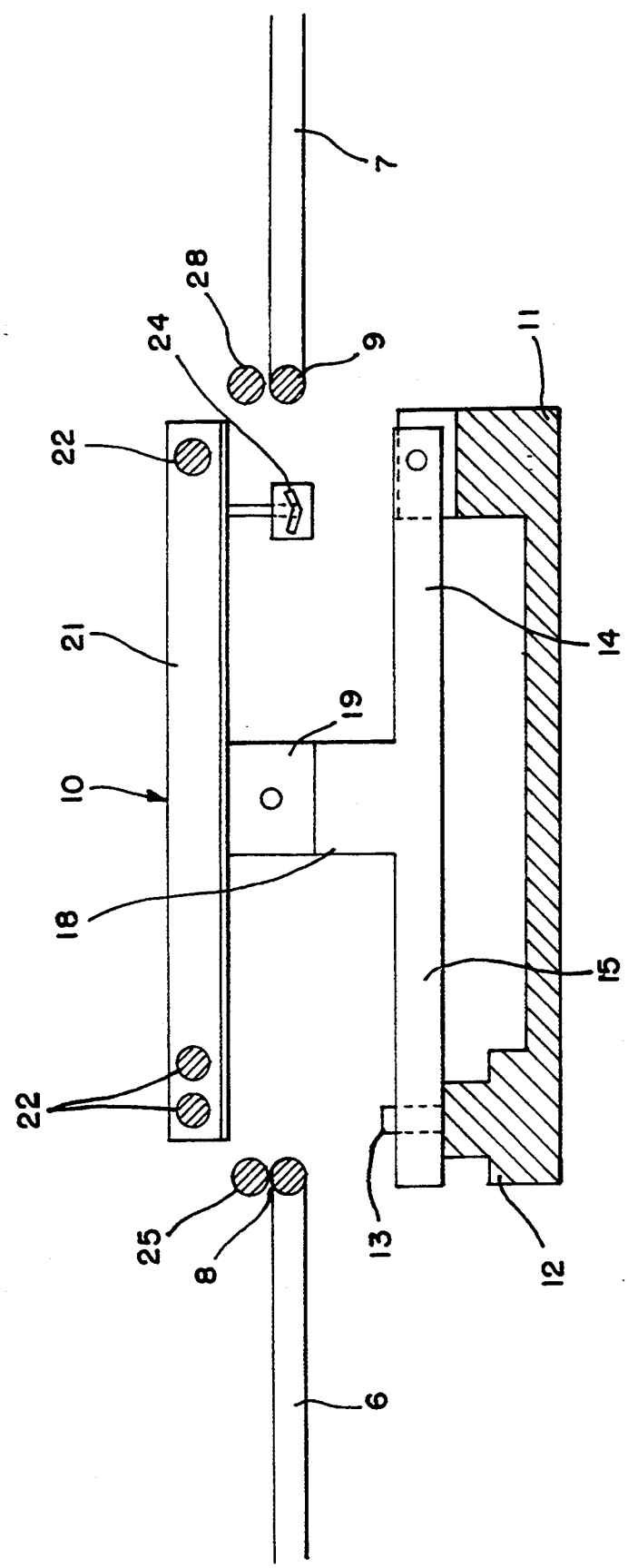
FIG. 7 is a side view of the conveyor shown in FIG. 6.

The conveyor device 10 in this example, has a length of 800 mm so that it fits between the input and output rollers 8 and 9 and a width of approximately 500 mm so that a sheet up to 50 centimeters can be carried. The conveyor 10 comprises a base frame 11 supporting the conveyor section above it. An input end 12 of the base frame has a vertically extending pivot pin 13 mounted at the longitudinal center of the incoming conveyor 6 and having its centerline substantially through the centerline of the input roller 8. A diamond shaped pivot frame 14 has an input corner 15 mounted on the pivot pin 13, the opposite output corner 16 being substantially aligned with the centerline of the incoming conveyor 6 but adjacent to the output roller 9 and the other two opposite corners 17 and 18 are at the left hand and right hand sides respectively of the incoming conveyor. Diagonally across the frame 14 is a center strut 19 and mounted at either end of center strut 19 are two side frames 20 and 21. Both side frames 20 and 21 are pivotally connected to the center strut so that they are maintained mutually parallel but can each move on that pivot defined by the center strut 19 so that either side frame 20 or 21 can be raised at one end and lowered at the other. Between both side frames 20 and 21 there is a series of parallel conveyor rollers 22 as shown in FIG. 6 so that the side frames provide a substantially continuous conveyor surface made up by these rollers 22. The ends of the center strut 19 slide on the machine base frame 11 so that they are held vertically in the same plane.

An actuator cylinder 23 which operates in the horizontal plane is connected to the output corner 16 of the frame 14 which allows the frame to be moved around its pivot 13 and thus to turn the conveyor assembly 10 toward the left or right hand side of the incoming conveyor path. Beneath an output end of each of the side frames 20 and 21 is provided a cam and follower mechanism 24 below its respective side frame and above the base frame 11 and this is arranged so that when the actuating cylinder 23 turns the pivot frame 14, one side frame has its input end raised at the same time as the other side frame has its input end lowered and visa versa at the output ends.

It should be noted that the conveyor 10 is mounted a small distance above the input and output conveyors 6 and 7 and this height difference is arranged to be such that at the maximum designed sideways movement of the conveyor 10 the lowest position of the side frame is still slightly above the level of the input and output conveyors 6 and 7.

Thus, by pivoting the frame 10 about the pivot point 13 one input corner of the conveyor 10 is raised and the other end of the roller extending from that input corner to the other side frame is lowered. This creates a change in the path lengths at each side of the incoming sheet which compensates for the angle of change of direction of the sheet as it runs on the conveyor 10. At the output end of the conveyor 10 the opposite effect occurs so that the sheet is steered back onto the output conveyor 7 and takes up a direction parallel to its incoming direction on the input conveyor. In other words, the diagonally opposed output corner is raised if the diagonally opposed input corner is lowered, with the opposite occurring to the remaining diagonal, thereby producing somewhat of a diagonally flexed frame between side frames 20 and 21. Thus by operation of the cylinder 23 the conveyor can be steered from side to side of the incoming direction as required.

An important advantage of the current invention is that the conveyor 10 is quite short and it provides accurate easy adjustment of sheet material onto the output conveyor without the previously known large assemblies where corrections were made during vertical movement to a conveyor substantially above the incoming and outgoing conveyors.

In addition, hold-down rollers 26 and 27 are positioned above at least one conveyor roller 22 at each of the input and output ends of the two side frames 20 and 21.

Having now described my invention what I claim is:
1. An apparatus for displacing a continuous sheet of material having a first edge and a second edge comprising:
    a feed conveyor carrying the sheet longitudinally in a first plane to a first support roller in the first plane, said first support roller extending perpendicularly to a centerline of the feed conveyor;
    a second support roller parallel to the first support roller and formed in a second plane;
    means for displacing at least one end of said second support roller from the second plane;
    a third support roller parallel to the first support roller, and longitudinally spaced from the second support roller within the second plane;
    means for displacing at least one end of said third support roller from the second plane, wherein the second and third support rollers are the beginning and end rollers of a set of support rollers all mutually parallel when viewed perpendicular to the plane and wherein the second and third support rollers are rotated about respective rotational axes thereof and in alignment with a longitudinal centerline of the sheet such that each roller remains, when viewed perpendicularly to said plane, perpendicular to the direction of movement of the sheet over the respective roller; and an output conveyor running parallel to the direction of the feed conveyor such that displacement of the second and third respective support rollers affect sideways displacement of the sheet between the feed conveyor and output conveyor.

2. The apparatus according to claim 1, wherein ends of the second and third support rollers opposing the displaced ends are positioned into the same plane as the feed and output conveyors.

3. The apparatus according to claim 1, wherein the second and third support rollers each have both ends positioned to the same side of the first plane and when one end is further displaced from the second plane the other end is oppositely moved towards the first plane.

4. The apparatus according to claim 1, wherein said set of rollers change progressively in an angle with respect to the first plane which provides for roller ends at gradually increasing and decreasing displacements along the length of the set of support rollers.

5. The apparatus according to claim 1, further comprising a hold down roller parallel to and co-operating with at least said first support roller.

6. The apparatus according to claim 1, wherein said second and third support rollers are mounted between a pair of parallel side frames which are interconnected and include drive means for mutually displacing the frames with respect to the second plane to provide displacement of said second and third support rollers.

7. The apparatus according to claim 6, wherein an interconnection between the side frames includes a transverse strut connecting the centers of the two side frames and pivotally connected to at least one of the side frames.

8. The apparatus according to claim 6, wherein one end of each side frame is connected to vertical displacement drive means comprising a cam and follower mechanism to effect the displacement.

9. The apparatus according to claim 8, wherein the strut is attached to a rectangular support frame parallel to the second plane having a pivotal axis at one end perpendicular to the plane and adjacent said first support roller and an actuator is provided to displace the other end of the frame in a direction parallel to the second plane to rotate the side frames and in turn said second and third support rollers by means of the cams.

10. An apparatus for laterally displacing a continuous sheet of material passing between an input conveyor and an output conveyor coplanar with the input conveyor, the apparatus comprising:

a base frame positioned between and below the coplanar surfaces of said input and output conveyors, said base frame including an input end adjacent said input conveyor and an output end adjacent said output conveyor;

a diamond-shaped pivot frame having one apex thereof pivotally supported at an input end of said base frame;

a center strut mounted on said diamond-shaped pivot frame perpendicular to a longitudinal axis of said base frame and centered between the input end and output end thereof;

a pair of parallel opposing side frames positioned above the coplanar surfaces of the input and output conveyors and pivotally mounted at a center of each opposing side frame to opposing ends of said center strut;

a plurality of conveyor rollers mounted in a series between said side frames and perpendicular to a longitudinal axis of said base frame; and means for pivotally laterally displacing said pivot frame in a horizontal plane with respect to a longitudinal axis thereof about the input end of said base frame; and means, responsive to said means for pivotally displacing, for vertically displacing one corner of said pair of parallel opposing side frames such that a diagonally opposing corner of said pair of parallel opposing side frames is oppositely vertically displaced, thereby effecting a sideways displacement of the continuous sheet of material in a direction opposite to the lateral displacement of said pivot frame.

11. The apparatus according to claim 10, wherein the series of conveyor rollers change progressively in an angle with respect to the horizontal plane thereby gradually increasing and decreasing the vertical displacement of conveyor roller ends within the series of conveyor rollers.

12. The apparatus according to claim 10, wherein said means for pivotally displacing said diamond-shaped pivot frame in the horizontal plane is a piston actuator connected to an apex of the diamond-shaped pivot frame adjacent the output conveyor.

13. The apparatus according to claim 10, wherein said means for vertically displacing includes a cam and follower mechanism connected to an output end of each of said side frames.

* * * * *